United States Patent [19]

Fukatsu

[11] Patent Number: 5,648,818
[45] Date of Patent: Jul. 15, 1997

[54] IMAGE PICKUP APPARATUS HAVING COLOR SEPARATION MATRIX

[75] Inventor: Tsutomu Fukatsu, Yokohama, Japan

[73] Assignee: Canon Kabushiki Kaisha, Tokyo, Japan

[21] Appl. No.: 132,195

[22] Filed: Oct. 6, 1993

[30] Foreign Application Priority Data

Oct. 9, 1992  [JP]  Japan ................... 4-297729
Dec. 25, 1992  [JP]  Japan ................... 4-346725

[51] Int. Cl.⁶ ................... H04N 3/14; H04N 9/73
[52] U.S. Cl. ................... 348/273; 348/223
[58] Field of Search ................... 348/223, 663,
348/669, 227, 273, 659, 225, 226, 268,
269, 224, 228; H04N 9/73, 9/04, 9/083,
9/77, 9/79, 9/07

[56] References Cited

U.S. PATENT DOCUMENTS 4,700,219  10/1987  Tanaka et al. ................... 358/29
4,974,066  11/1990  Tusji ................... 358/44
5,253,047  10/1993  Machishima ................... 358/44
5,384,595  1/1995  Sakaguchi ................... 348/226
5,398,058  3/1995  Hattori ................... 348/224

FOREIGN PATENT DOCUMENTS

0586204A1  8/1993  Japan ................... H04N 9/73

*Primary Examiner*—Victor R. Kostak
*Attorney, Agent, or Firm*—Fitzpatrick, Cella, Harper & Scinto

[57] ABSTRACT

An image pickup apparatus including an image pickup device to convert an image pickup light from an object to be photographed into an electric signal, a signal processing circuit to obtain a luminance component signal and color difference component signals on the basis of an output of the image pickup device and a color separation matrix circuit to obtain chrominance signals from the luminance component signal and the color difference component signals. Matrix coefficients in the color separation matrix circuit are determined so as to obtain the optimum chrominance signals when the luminance component signal and the color difference component signals obtained by photographing an object of each color are color separated.

1 Claim, 9 Drawing Sheets

FIG. 1

|  | m COLUMN | m+1 COLUMN |
|---|---|---|
| n ROW | Mg | G |
| n+1 ROW | Cy | Ye |
| n+2 ROW | G | Mg |
| n+3 ROW | Cy | Ye |
| n+4 ROW | Mg | G |

FIG. 4

| a | b | c |
|---|---|---|
| d | e | f |
| g | h | i |

IMAGE PICKUP APPARATUS HAVING COLOR SEPARATION MATRIX

BACKGROUND OF THE INVENTION

1. Field of the Invention

The present invention relates to an image pickup apparatus of a video camera or the like having a color separation matrix.

2. Related Background Art

Hitherto, there has been known a color filter such that complementary colors (magenta Mg, green G, cyan Cy, yellow Ye) as shown in FIG. 1 are arranged like a mosaic.

In an image pickup apparatus such as a video camera or the like having a CCD in which the color filter of the complementary color mosaic as mentioned above is arranged in front of the CCD, in order to finally obtain a luminance signal and color difference signals, by controlling the reading operation from the CCD in the following manner, predetermined image pickup (pixel) outputs which are obtained from the above complementary color filters are added, thereby reading out those signals.

That is, in even number fields, pixel outputs of the nth row and the (n+1)th row, which are neighboring in the vertical direction, are added each column and pixel outputs of the (n+2)th row and the (n+3)th row are added every column, thereby reading out the pixel outputs. In odd number fields, pixel outputs of the (n+1)th and (n+2)th rows and the (n+3)th and (n+4)th rows which are deviated by every row from the even number fields are respectively added every line, thereby reading out the pixel outputs.

Due to this, Mg+Cy=WB(R+G+2B) is derived from the portion of the nth row and the mth column of the even number field. G+Ye=GR(2G+R) is obtained from the portion of the nth row and the (m+1)th column. G+Cy=GB (2G+B) is obtained from the portion of the (n+1)th row and the mth column. Mg+Ye=WR(2R+G+B) is obtained from the portion of the (n+1)th row and the (m+1)th column.

On the other hand, G+Cy=GB(2G+B) is derived from the portion of the nth row and the mth column of the odd number field. Ye+Mg=WR(2R+G+B) is obtained from the portion of the nth row and the (m+1)th column. Cy+Mg=WB(R+G+ 2B) is derived from the portion of the (n+1)th row and the mth column. Ye+G=GR(2G+R) is obtained from the portion of the (n+1)th row and the (m+1)th column.

Further, in a processing circuit arranged at the post stage of the CCD, by adding or subtracting the four kinds of device outputs as mentioned above, the following luminance component signal and color difference component signals are obtained.

Luminance component signal: y=WB+GR/WR+GB
Color difference component signals:

*cr=WR−GB, cb=WB−GR*

In the conventional video camera, the luminance component signal and the color difference component signals which were obtained as mentioned above are directly used as a luminance signal and color difference signals.

Different from the components which have been determined by the NTSC standard, the color difference component signals as mentioned above have a problem such that accurate color difference signals cannot be obtained and color reproducibility is bad.

SUMMARY OF THE INVENTION

The present invention is made in consideration of the above circumstances and it is an object of the invention to provide an image pickup apparatus which can realize good color reproducibility.

According to an embodiment of the invention, to accomplish the above object, there is provided an image pickup apparatus comprises: image pickup means for converting an image pickup light from an object to be photographed into an electric signal; signal processing means for obtaining a luminance component signal and color difference component signals on the basis of an output of the image pickup means; and color separation matrix means for obtaining chrominance signals from the luminance component signal and the color difference component signals, wherein matrix coefficients in the color separation matrix means are determined so as to obtain optimum chrominance signals when the luminance component signal and the color difference component signals which were obtained by photographing the object of each color are color separated.

According to another embodiment of the invention, to accomplish the above object, there is provided an image pickup apparatus comprising: image pickup means for converting an image pickup light from an object to be photographed into an electric signal; signal processing means for obtaining a luminance component signal and color difference component signals on the basis of an output of the image pickup means; color separation matrix means for obtaining chrominance signals from the luminance component signal and the color difference component signals; color temperature detecting means for detecting a color temperature of the object; and control means for correcting color separation matrix coefficients in the color separation matrix means on the basis of a detection output of the color temperature detecting means.

According to the embodiments of the constructions as mentioned above, accurate chrominance signals can be obtained and, finally, accurate color difference signals can be derived.

Good color reproducibility in such a kind of image pickup apparatus, consequently, can be obtained.

The color separating process corresponding to the color temperature upon photographing can be executed, so that good color reproducibility can be realized.

The above and other objects and features of the present invention will become apparent from the following detailed description and the appended claims with reference to the accompanying drawings.

BRIEF DESCRIPTION OF THE DRAWINGS

FIG. 1 is a diagram showing a color arrangement of a general complementary mosaic color filter;

FIG. 4 is a diagram showing a pixel arrangement which is used in matrix arithmetic operations;

DETAILED DESCRIPTION OF THE PREFERRED EMBODIMENTS

Figure 2:
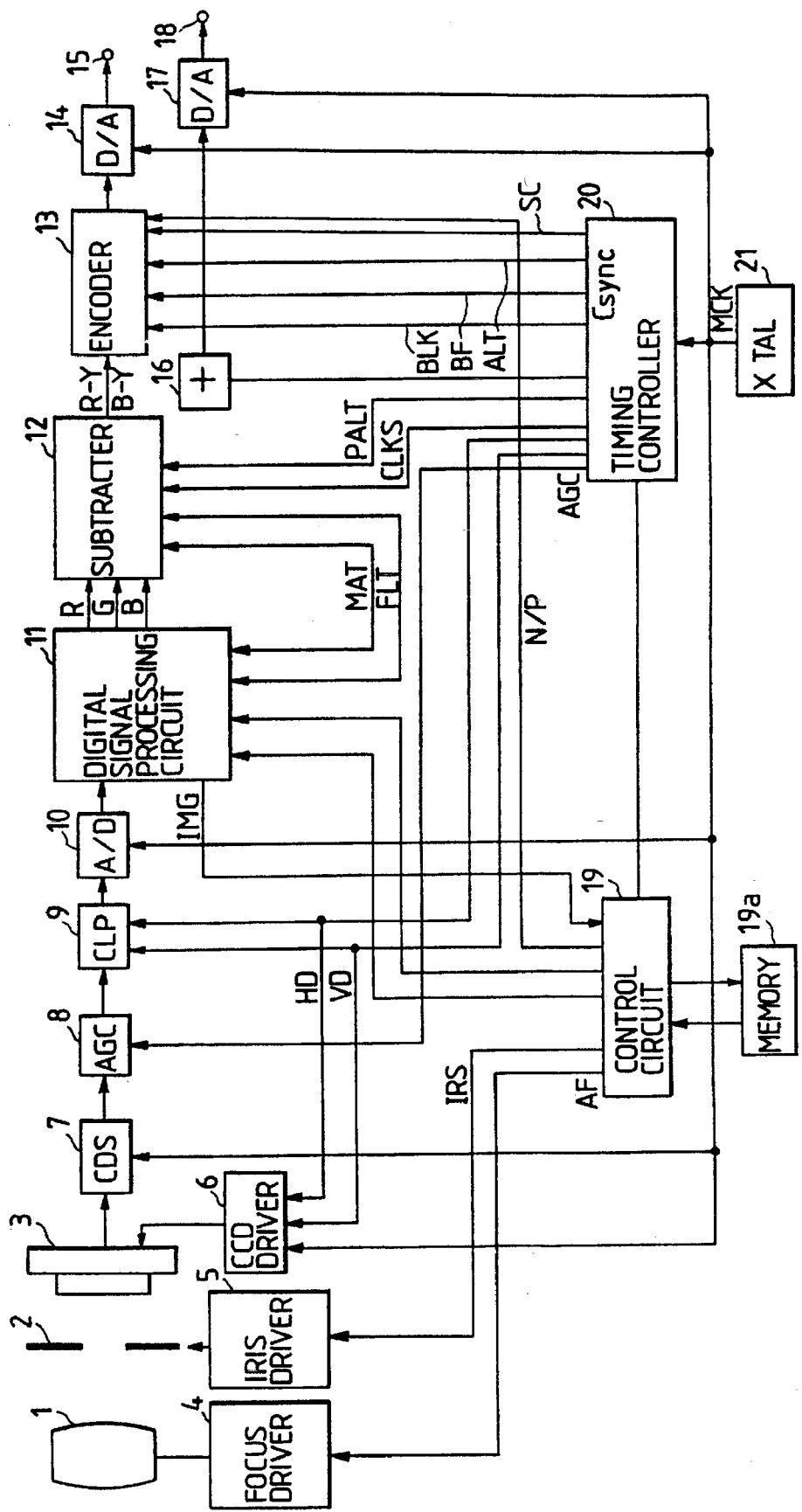
FIG. 2 is a block diagram showing an electrical construction of an embodiment of an image pickup apparatus according to the invention.
Figure 3:
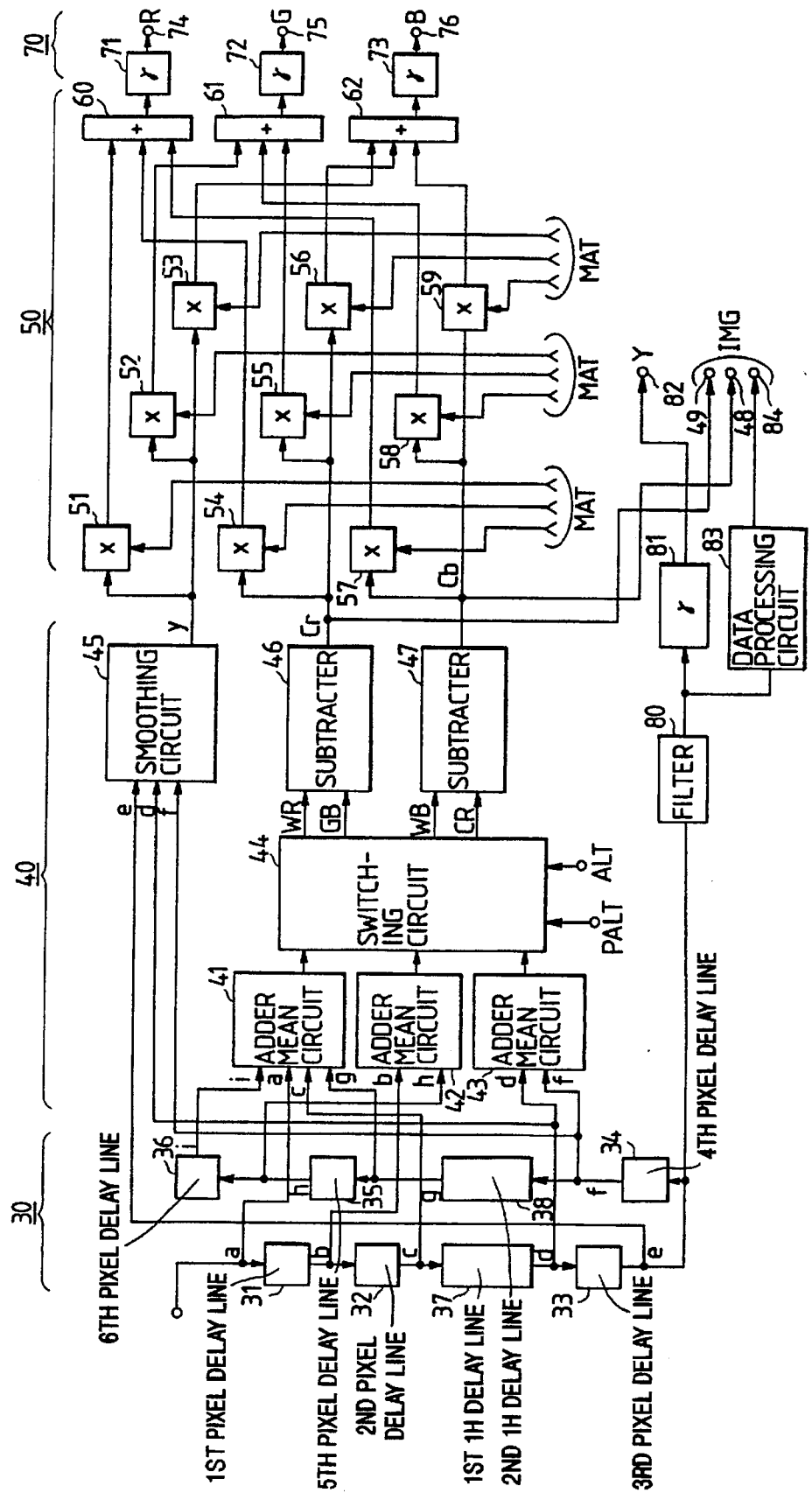
FIG. 3 is a block diagram showing a specific construction of a digital signal processing circuit in the image pickup apparatus according to the invention.

A preferred embodiment of an image pickup apparatus according to the invention will be described in detail hereinbelow with reference to FIGS. 2 to 4.

According to the embodiment, the luminance component signal and color difference component signals obtained as mentioned above are subjected to matrix arithmetic operations by using predetermined color separation matrix coefficients, thereby forming accurate chrominance signals and forming the color difference signals on the basis of the chrominance signals. FIG. 2 is a block diagram showing an electrical construction of a video camera according to the embodiment.

In the video camera, an image pickup light from an object to be photographed is irradiated to a photosensitive surface of an image pickup device such as a CCD 3 or the like through an optical system comprising a focusing lens 1 and an iris 2 and the like. A color filter as shown in FIG. 1 described above is arranged in front of the photosensitive surface of the CCD 3.

The focusing lens 1 is driven by a focus driver 4. The iris 2 is driven by an iris driver 5. The CCD 3 is driven by a CCD driver 6.

On the other hand, the image pickup output generated from the CCD 3 is converted into the image pickup signal by a general CDS circuit 7. A gain of the image pickup signal is adjusted by an AGC circuit 8. After that, an output signal of the AGC circuit 8 is clamped by a clamping circuit 9. An image pickup signal from the clamping circuit is converted into a digital signal by an A/D converter 10 and supplied to a digital signal processing circuit 11.

The digital signal processing circuit 11 executes signal processes as will be explained herein-later on the basis of the digital image pickup signal, thereby forming chrominance signals R, G, and B and a luminance signal Y.

The chrominance signals are supplied to a subtracter 12, by which a subtracting process is executed. Thus, color difference signals R-Y (=0.7R- 0.59G-0.11B) and B-Y (=-0.3R-0.59G+0.89B) are obtained.

The color difference signals are supplied to an encoder 13 and are frequency modulated by predetermined modulation signals. The modulated signals are further converted into the analog signals by a D/A converter 14 and are taken out from a color difference signal output terminal 15.

A composite sync signal is added by an adder 16 to the luminance signal which is generated from the digital signal processing circuit 11. The resultant luminance signal is converted into the analog signal by a D/A converter 17 and is taken out from a luminance signal output terminal 18.

The above luminance signal and color difference signals are supplied to a recording or reproducing system (not shown) and are recorded onto a recording medium such as a magnetic tape or the like.

Each of the above circuits is controlled by a control circuit 19 using a microcomputer or the like, a timing controller 20 which is controlled by the control circuit 19, and various kinds of signals which are generated from a clock oscillator 21. The control circuit 19 forms a matrix coefficient signal and a gain control signal on the basis of an internal program (not shown) and the luminance component signal and color difference component signals which are obtained from the digital signal processing circuit 11.

That is, the control circuit 19 supplies a focus control signal AF and an iris control signal IRS to the focus driver 4 and iris driver 5 in order to drive and control them. The control circuit 19 also supplies a color separation matrix signal MAT and a filter constant signal FLT to the digital signal processing circuit 11 and supplies an NTSC/PAL switching signal N/P to the encoder 13.

The timing controller 20 supplies a horizontal sync signal HD and a vertical sync signal VD to the clamping circuit 9 and CCD driver 6 and also supplies a gain control signal AGC to the AGC circuit 8.

Further, the timing controller 20 supplies a dot-sequential signal PALT and a clock signal CLKS to the digital signal processing circuit 11. The timing controller 20 also supplies a burst flag BF, a blanking pulse BLK to form a television signal, a line sequential signal ALT, and a color subcarrier SC to modulate the color difference signals to the encoder 13. The timing controller also supplies a composite sync signal CSYNC to the adder 16.

A main clock MCK which is generated from the clock oscillator 21 is supplied to the CCD driver 6, CDS circuit 7, A/D converter 10, and D/A converters 14 and 17.

Specific construction of a main section of the digital signal processing circuit 11 will now be described with reference to FIGS. 3 and 4.

The digital signal processing circuit 11 is schematically constructed by a delay section 30, a pre-processing section 40, a matrix operating section 50, and a post-processing section 70. After the image pickup signals of predetermined pixels were extracted by the delay section 30, a luminance component signal y and color difference signals cr and cb are produced from those image pickup signals by the pre-processing section 40.

After that, matrix arithmetic operations are executed among the luminance component signal and the color difference component signals and matrix coefficients which are supplied from the control circuit 19 by the matrix operating section 50. The signals after completion of the matrix arithmetic operations are subjected to post-processes by the post-processing section 70, thereby obtaining the accurate chrominance signals R, G, and B.

A detailed construction will now be described with reference to FIG. 3.

The delay section 30 comprises: first to sixth pixel delay lines 31, 32, 33, 34, 35, and 36; and first and second 1H delay lines 37 and 38. Each of the 1H delay lines has a delay time of two pixels of 1H (H: horizontal scan period).

As for a central pixel (e) shown in FIG. 4, the delay section 30 extracts the pixel outputs of its peripheral pixels (a to i). When the output of the pixel (a) is supplied to the first pixel delay line 31, the first pixel delay line 31 generates the pixel (b), the second pixel delay line 32 generates the pixel (c), the first 1H delay line 37 generates the pixel (d), the third pixel delay line 33 generates the pixel (e), the fourth pixel delay line 34 generates the pixel (f), the second 1H delay line 38 generates the pixel (g), the fifth pixel delay line 35 generates the pixel (h), and the sixth pixel delay line 36 generates the pixel (i) simultaneously.

The pixel outputs extracted as mentioned above are supplied to the pre-processing section 40, for the luminance component signal y and the color difference component signals cr and cd.

The pre-processing section 40 comprises: first to third adder mean circuits 41, 42, and 43; a switching circuit 44; a smoothing circuit 45; and first and second subtracters 46 and 47. The outputs of the pixels (d, e, f) are supplied to the smoothing circuit 45, so that the luminance component signal y is generated. The outputs of the pixels (a, c, g, i) are suplied to the first adder mean circuit 41. The outputs of the pixels (b, h) are supplied to the second adder mean circuit 42. The outputs of the pixels (d, f) are supplied to the third adder mean circuit 43.

Outputs of the first to third adder mean circuits 41, 42, and 43 are supplied to the switching circuit 44. On the basis of the line sequential signal ALT and the dot sequential signal PALT which are supplied from the control circuit 19, the switching circuit 44 changes a combination of the outputs of the adder mean circuits, thereby generating signals WR, GB, WB, and GR, respectively.

The output signals of the adder mean sections are supplied to the first and second subtracters 46 and 47, by which subtracting processes of (WR−GB) and (WB−GR) are executed and the color difference signals cr and cb are generated from the subtracters.

The color difference component signals cr and cb generated from the subtracters 46 and 47 are supplied to the matrix operating section 50 at the post stage and are also supplied to the control circuit 19 through output terminals 49 and 48.

The luminance component signal and color difference component signals which are generated from the pre-processing section 40 are supplied to the matrix operating section 50, by which predetermined color separation matrix arithmetic operations are executed.

The matrix operating section 50 is constructed by a plurality of multipliers 51 to 59 and first to third adders 60, 61, and 62. Matrix coefficients of the adders are set on the basis of matrix coefficient signals which are supplied from the control circuit 19 and matrix arithmetic operations of (3×3) are executed. Outputs of the multipliers are subjected to adding processes by the adders, so that the chrominance signals of R, G, and B are obtained.

The chrominance signals are finally processed by the post-processing section 70 comprising gamma knee processing circuits 71, 72, and 73. The processed signals are taken out from output terminals 74, 75, and 76, respectively.

On the other hand, the output (e) of the third pixel delay line 33 of the delay section 30 is supplied to a gamma knee processing circuit 81 through a filter 80 for extraction of the luminance signal, so that the luminance signal is produced and taken out from an output terminal 82.

An output of the filter 80 is supplied to a data processing section 83 and is subjected to a predetermined process. After that, the processed signal is supplied to the control circuit 19 through an output terminal 84.

A method of forming the matrix coefficients in the control circuit 19 will now be described in detail.

In the embodiment, objects of the colors of R, G, and B are previously photographed upon adjustment at, for example, a producing stage or the like and matrix coefficients such as to set the image pickup outputs (chrominance signals) in this instance to predetermined values are initialized. Color temperatures of the objects are detected on the basis of the luminance component signal and color difference component signals. The above matrix coefficients are corrected on the basis of the detection outputs.

Explanation will now be made in detail hereinbelow.

First, pixel outputs (signal data) Sigx, Sigy, and Sigz, on the assumption that the chrominance signals R, G, and B are set to predetermined values X, Y, and Z, are set to $$Sig_x = (WB_x, WR_x, GR_x, GB_x)$$

$$Sig_y = (WB_y, WR_y, GR_y, GB_y)$$

$$Sig_z = (WB_z, WR_z, GR_z, GB_z)$$

and the above matrix coefficients A for the color separation are set to A=[$\beta i\ \alpha ij$](i=0, 1, 2, j=0, 1, 2).

Thus, the following equations (1) to (3) are obtained.

$$A*Sig_x = (X, 0, 0) \quad (1)$$

$$A*Sig_y = (0, Y, 0) \quad (2)$$

$$A*Sig_z = (0, 0, Z) \quad (3)$$

when i=0, (k0, k1, k2)=(X, 0, 0)
when i=1, (k0, k1, k2)=(0, Y, 0)
when i=2, (k0, k1, k2)=(0, 0, Z)
It is now assumed as follows.

$$x0 = WB_x + GR_x, \text{ (or } WR_x + GB_x\text{)}$$

$$y0 = WB_y + GR_y, \text{ (or } WR_y + GB_y\text{)}$$

$$z0 = WB_z + GR_z, \text{ (or } WR_z + GB_z\text{)}$$

$$x1 = WR_x - GB_x, \ y1 = WR_y - GB_y, \ z1 = WR_z - GB_z,$$

$$x2 = WB_x - GR_x, \ y2 = WB_y - GR_y, \ z2 = WB_z - GR_z,$$

By solving the above equations (1), (2), and (3) with respect to the matrix coefficients A=[$\beta i\ \alpha ij$], the following equations are obtained.

$$\alpha i0 = \{(k0y2 - k1x2)(y1z2 - y2z1) - (k1z2 - k2y2)(z1y2 - x2y1)\} \div \{(x0y2 - x2y0)(y1z2 - y2z1) - (x1y2 - x2y1)(y0z2 - y2z0)\} \quad (4)$$

$$\alpha i1 = \{(k1z2 - k2y2) - (y0z2 - y2z0)\alpha i0\}/(y1z2 - y2z1) \quad (5)$$

$$\alpha i2 = (k1 - \alpha i0 y0 - \alpha i1 y1)/y2 \quad (6)$$

In the embodiment, by substituting predetermined values (luminance component signal and color difference component signals) into the equations (4), (5), and (6), the control circuit 19 previously obtains the matrix coefficients for color separation and stores into a memory circuit 19a, and allows the digital signal processing circuit 11 to execute the matrix arithmetic operations on the basis of the coefficient values.

In the embodiment, the control circuit 19 stores the matrix data obtained at different color temperatures K0 and K1 with respect to the matrix coefficients as mentioned above into the memory circuit 19a and corrects the matrix coefficients at the color temperatures at the time of each photographing operation as shown in the following equation (7) in accordance with the above matrix data and the color temperature information detected on the basis of the color difference component signals.

That is, now assuming that the matrix coefficients at the color temperature K0 are set to $\alpha 0i$ and the matrix coefficients at the color temperature K1 are set to $\alpha 1i$, the matrix coefficients $\alpha ij$ at the time of a certain photographing operation are calculated on the basis of the equation (7).

$$\alpha ij = k\alpha 0i + (1-k)\alpha 1i \quad (7)$$

As mentioned above, in the embodiment, the image pickup output derived from the CCD 3 is separated to the chrominance signals on the basis of the color separation matrix and the inherent color difference signals are obtained on the basis of the chrominance signals. Further, since the color separation matrix has been set so as to obtain the optimum chrominance signals by previously photographing the objects of the respective colors, extremely accurate chrominance signals can be obtained and good color reproducibility can be realized.

In the embodiment, moreover, by properly correcting the color separation matrix coefficients in accordance with the color temperature upon photographing, accurate chrominance signals can be obtained without being influenced by the color temperature.

In the embodiment, by executing the color separation matrix arithmetic operations to the luminance component signal and color difference signals, the matrix arithmetic operations can be set to the matrix arithmetic operations of (3×3). A processing time which is required for the matrix arithmetic operations can be reduced and a construction for the matrix arithmetic operations can be simplified.

Although the color temperature detecting means in the embodiment takes out the color difference components from the signal lines and detects the color temperature, it is also possible to use another detecting means so long as it has a color measuring sensor.

As mentioned above, according to the image pickup apparatus of the embodiment, the image pickup output is separated into the chrominance signals on the basis of the color separation matrix and the inherent color difference signals are obtained on the basis of the chrominance signals. Further, the color separation matrix has been set so as to obtain the optimum chrominance signals by previously photographing the objects of the respective colors. Therefore, extremely accurate chrominance signals can be obtained and good color reproducibility can be realized.

In the embodiment, by properly correcting the color separation matrix coefficient in accordance with the color temperature upon photographing, the accurate chrominance signals can be obtained without being influenced by the color temperature, so that good color reproducibility can be also realized.

Other embodiments of the invention will now be described.

According to the following embodiment, in a step of obtaining primary color components by executing arithmetic operating processes to multiply predetermined arithmetic operation coefficients to output signals corresponding to the different color lights of a solid state image pickup device, the color separation is executed while adjusting the arithmetic operation coefficients.

By using such a color separating method, a quantitative hue adjustment is executed.

According to another embodiment, by switching coefficients of a color signal demodulation matrix by a movement vector of a video signal, an interference such as a vertical false color or the like can be suppressed even in the video signal other than still images.

According to still another embodiment, in a color temperature range T0 to T1 in which good color separating characteristics should be maintained, when a color separation matrix $\alpha 0ij$ obtained from the object data derived in T0 and a color separation matrix $\alpha 1ij$ obtained from the object data derived in T1 are obtained, the color separation is executed by the following matrix $$aij = k\alpha 0ij + (1-K)\alpha 1ij \ (k=0-1)$$

and good color separating characteristics can be realized.

A color separation sequence in the embodiment will be first explained.

When RGB composition aij (i=0, 1, 2; j=0, 1, 2) of an output signal of the solid-state image pickup device are obtained as shown by the following equation $$\begin{pmatrix} Wb \\ Wr \\ Gr \\ Gb \end{pmatrix} = \begin{pmatrix} a_{00} & a_{01} & a_{02} \\ a_{10} & a_{11} & a_{12} \\ a_{20} & a_{21} & a_{22} \\ a_{30} & a_{31} & a_{32} \end{pmatrix} \begin{pmatrix} R \\ G \\ B \end{pmatrix}$$

and hue gain coefficients on axes of Ye, Cy, and Mg are set to K0, K1, and K2 as hue adjustment coefficients, the color separation matrix aij is determined as follows.

$$\begin{pmatrix} R \\ G \\ B \end{pmatrix} = \begin{pmatrix} a_{00} & a_{01} & a_{02} \\ a_{10} & a_{11} & a_{12} \\ a_{20} & a_{21} & a_{22} \end{pmatrix} \begin{pmatrix} Y \\ CR \\ CB \end{pmatrix}$$

In the above equation, $\alpha i0 = ((r*y2 - g*x2)*(y1*z2 - y2*z1) - (g*z2 - b*y2)*(x1*y2 - x2*y1))/$
$((x0*y2 - x2*y0)*(y1*z2 - y2*z1) - (x1*y2 - x2*y1)*(y0*z2 - y2*z0));$ $\alpha i1 = ((r*z2 - b*y2) - (y0*z2 - y2*z0)*\alpha[i][0])/(y1*z2 - y2*z1);$ $\alpha i2 = (g - \alpha[i][0]*y0 - \alpha[i][1]*y1)/y2;$ where, $$(r,g,b) = \begin{cases} (1,0,0)(i=0) \\ (0,1,0)(i=1) \\ (0,0,1)(\text{when } i=2) \end{cases}$$

$x0 = ccd\_[WB][RD] + ccd\_[GR][RD]$ or
$\quad ccd\_[WR][RD] + ccd\_[GB][RD]$ $y0 = ccd\_[WB][GN] + ccd\_[GR][GN]$ or
$\quad ccd\_[WR][GN] + ccd\_[GB][GN]$ $z0 = ccd\_[WB][BL] + ccd\_[GR][BL]$ or
$\quad ccd\_[WR][BL] + ccd\_[GB][BL]$ $x1 = ccd\_[WR][RD] - ccd\_[GB][RD];$ $y1 = ccd\_[WR][GN] - ccd\_[GB][GN];$ $z1 = ccd\_[WR][BL] - ccd\_[GB][BL];$ $x2 = ccd\_[WB][RD] - ccd\_[GR][RD];$ $y2 = ccd\_[WB][GN] - ccd\_[GR][GN];$ $z2 = ccd\_[WB][BL] - ccd\_[GR][BL];$ $ccd\_[WB][RD] = (k1*k2*(a00 + a01) - k2*k0*(a01 + a02) +$
$\quad k0*k1*(a02 + a00))/(2*k0*k1*k2);$ $ccd\_[WB][GN] = (k1*k2*(a00 + a01) - k2*k0*(a01 + a02) +$
$\quad k0*k1*(a02 + a00))/(2*k0*k1*k2);$ $ccd\_[WB][BL] = (-k1*k2*(a00 + a01) + k2*k0*(a01 + a02) +$
$\quad k0*k1*(a02 + a00))/(2*k0*k1*k2);$ -continued $ccd\_[WR][RD] = (k1*k2*(a10 + a11) - k2*k0*(a11 + a12) +$ $k0*k1*(a12 + a10))/(2*k0*k1*k2);$ $ccd\_[WR][GN] = (k1*k2*(a10 + a11) - k2*k0*(a11 + a12) +$ $k0*k1*(a12 + a10))/(2*k0*k1*k2);$ $ccd\_[WR][BL] = (-k1*k2*(a10 + a11) + k2*k0*(a11 + a12) +$ $k0*k1*(a12 + a10))/(2*k0*k1*k2);$ $ccd\_[GR][RD] = (k1*k2*(a20 + a21) + k2*k0*(a21 + a22) +$ $k0*k1*(a22 + a20))/(2*k0*k1*k2);$ $ccd\_[GR][GN] = (k1*k2*(a20 + a21) + k2*k0*(a21 + a22) +$ $k0*k1*(a22 + a20))/(2*k0*k1*k2);$ $ccd\_[GR][BL] = (-k1*k2*(a20 + a21) + k2*k0*(a21 + a22) +$ $k0*k1*(a22 + a20))/(2*k0*k1*k2);$ $ccd\_[GB][RD] = (k1*k2*(a30 + a31) + k2*k0*(a31 + a32) +$ $k0*k1*(a32 + a30))/(2*k0*k1*k2);$ $ccd\_[GB][GN] = (k1*k2*(a30 + a31) + k2*k0*(a31 + a32) +$ $k0*k1*(a32 + a30))/(2*k0*k1*k2);$ $ccd\_[GB][BL] = (-k1*k2*(a30 + a31) + k2*k0*(a31 + a32) +$ $k0*k1*(a32 + a30))/(2*k0*k1*k2);$ By the above sequence based on the above equations, RGB signals which were more desirably adjusted are obtained.

Practical embodiments will now be described in detail hereinbelow.

Figure 5:
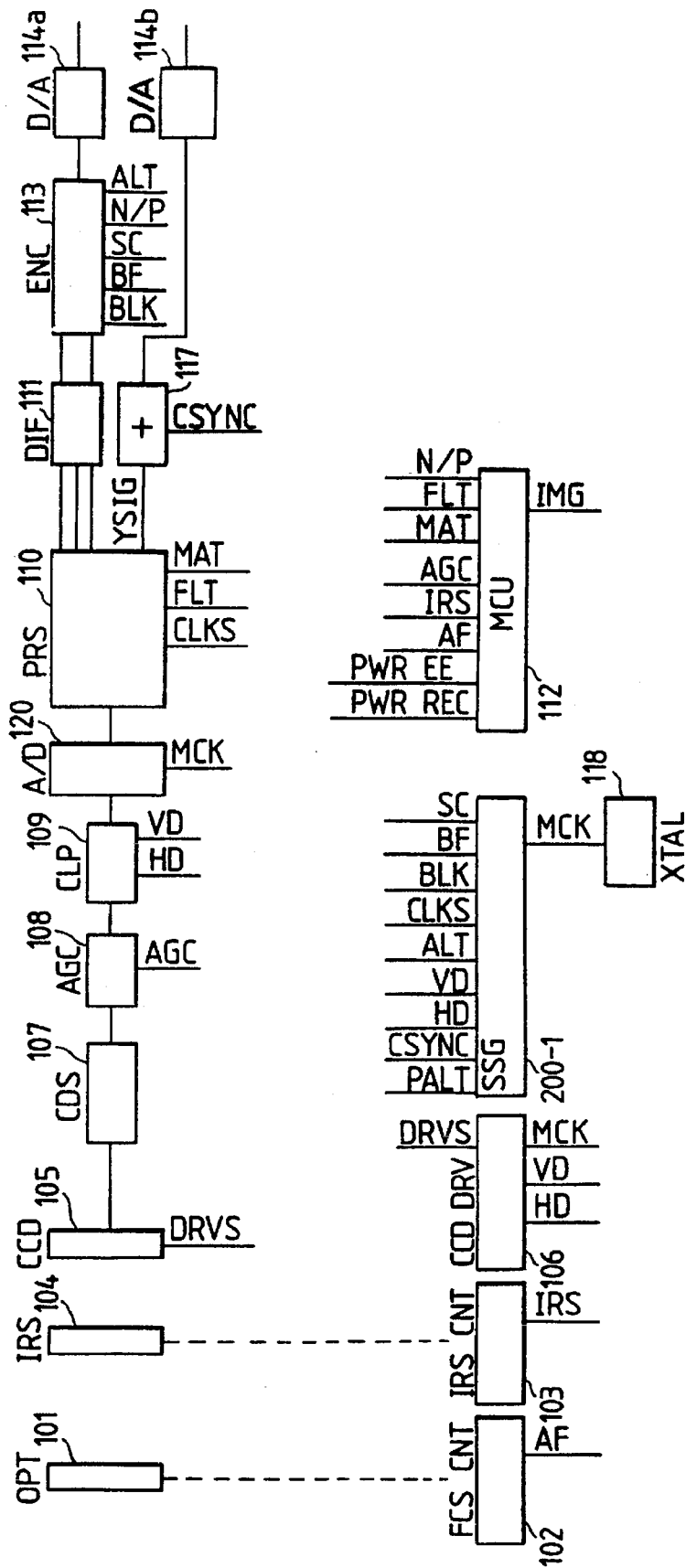
FIG. 5 is a block diagram showing an embodiment of the invention.

FIG. 5 is a block diagram of a solid-state image pickup apparatus to realize the embodiment.

Reference numeral 101 denotes an image pickup optical processing system such as a lens or the like; 102 a focusing control system to control a focal point of the image pickup lens; 103 an iris control system to control an incident light amount; 104 an iris to control the incident light amount; 105 a 2-dimensional color image pickup device as a photoelectric converting device including a micro color separation filter having a color arrangement in FIG. 1; and 106 a driving circuit to drive the image pickup device 105. The driving circuit 106 generates a control signal to transfer the charges accumulated in the photoelectric converting device in the image pickup device in a period of time corresponding to a vertical blanking period of time of a television signal to a vertical transfer section and a control signal to transfer the charges ix a horizontal transfer section which were transferred from the vertical transfer section in a period of time corresponding to a video signal effective period of time of the television signal.

Reference numeral 107 denotes a correlation double sampling circuit (CDS) to eliminate reset and clock noises in the output signal from the image pickup device; 108 a variable gain amplifier (AGC) to vary a gain of an output signal of the CDS 107 in accordance with a control voltage at a control voltage input terminal; 109 a clamping circuit to fix a black level of the input video signal to a predetermined voltage; 110 a signal processing circuit to form a luminance signal and color difference signals in the television signal from an AGC output signal; 111 a color difference matrix processing section to form color difference signals R-Y and B-Y from primary color signals obtained by the signal processing circuit 110; and 112 a microcontrol unit (MCU) which receives digital data regarding the signals obtained from the signal processing circuit 110 and generates control signals to the signal processing circuit 110, focusing control system, incident light amount control system, and gain control system by the data obtained by processing the digital data.

Reference numeral 113 denotes a carrier chrominance signal modulating circuit to form carrier chrominance signals according to a predetermined broadcasting standard from the color difference signals derived from the signal processing circuit 110.

Reference numeral 114 denotes a D/A converter to convert the digital signal data into the analog signal; 115 a carrier chrominance signal output terminal; 116 a luminance signal output terminal; 117 an adder; 118 an oscillator; 120 an A/D converter to generate digital data according to an input signal; and 200-1 a timing controller to generate the A/D conversion clock horizontal sync signal HD to generate the digital data according to the input signal, the vertical sync signal VD, the NTSC/PAL standard switching signal N/P, clocks CLOCKS each having a frequency and a phase which are necessary for each processing section, the blanking pulse BLK to form the television signal, the burst flag pulse BF, the color subcarrier SC, the line sequential signal ALT, the dot sequential signal PALT, the composite sync signal CSYNC, and the like.

Figure 6:
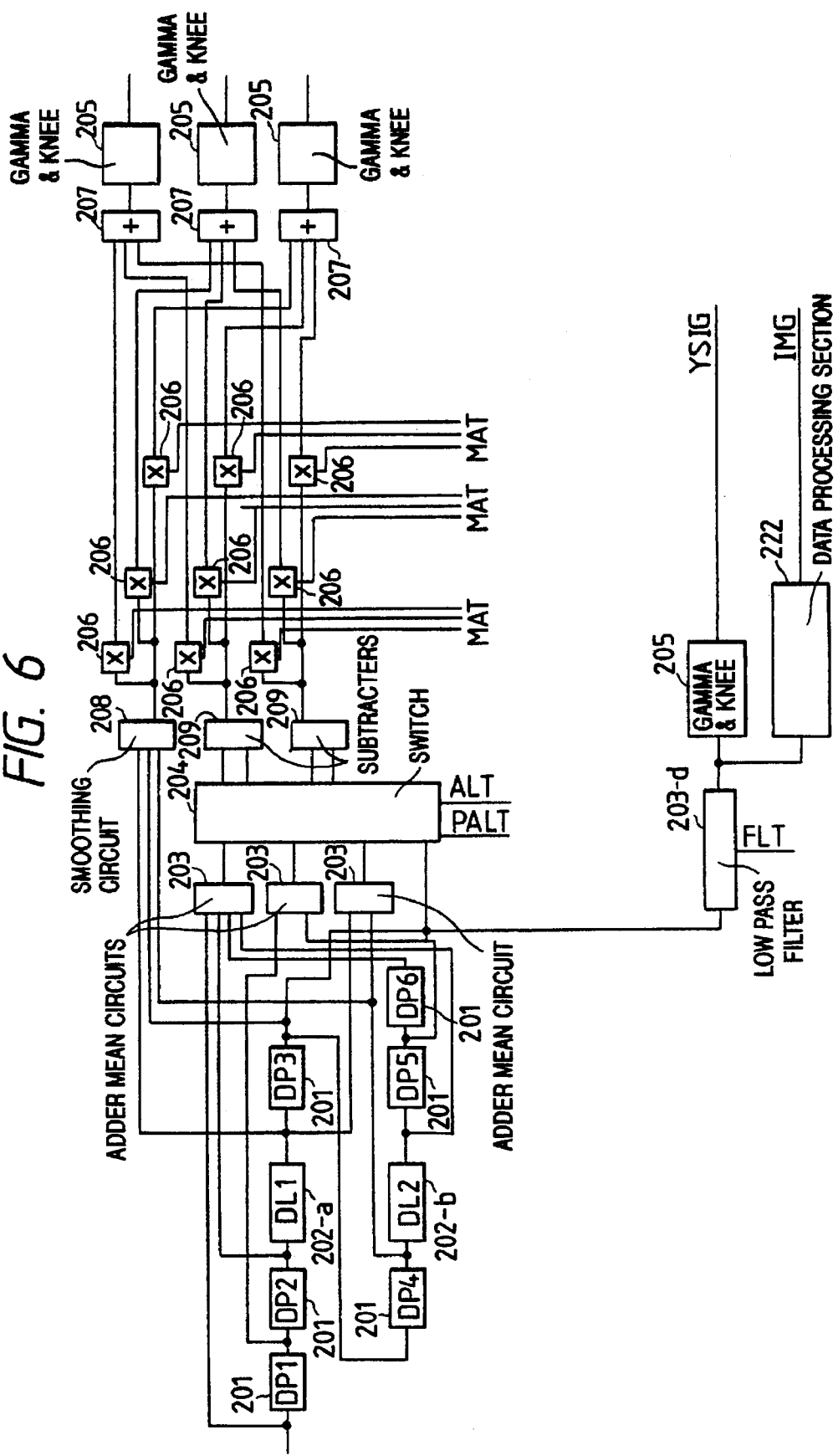
FIG. 6 is a diagram showing an example of a construction in a signal processing circuit 110 shown in FIG. 5.

FIG. 6 is a diagram showing an example of a construction in the signal processing circuit 110 shown in FIG. 5. Reference numeral 201 denotes a digital data delay circuit of a fixed length (one horizontal pixel); 202 a digital data delay circuit of a fixed length (one horizontal line—two pixels); 203 a circuit to obtain an adder mean of the input digital data; 204 a switch; 205 a gamma knee processing section to perform a gamma correction and a level compression of a high luminance portion; 206 a multiplier; 207 an adder; 208 a smoothing circuit; 209 a subtracter; and 222 a data processing section for executing a pre-process so that the MCU can easily receive and process the data signals which are necessary when the MCU controls each of the above processing systems. An incident light amount of an object to be photographed (not shown) is adjusted by the image pickup lens 101 and iris control system 103 and is accumulated as charges into the photosensitive accumulating section of the image pickup device 105 (FIG. 5). The accumulated charges are transferred to the vertical transfer section in the image pickup device (not shown) within a period of time corresponding to a vertical blanking period of time of the video signal. The charges transferred to the vertical transfer section are sent to the horizontal transfer section (not shown) in the image pickup device for the horizontal blanking period of time. The charges transferred to the horizontal transfer section are generated from the horizontal transfer section in the effective video period of time and are converted into a voltage. Subsequences of the signals which are read out and signal compositions are shown below.

Even number field, nth row:

mth column Mg'+Cy'=xR+yG+zB;WB (m+1)th column G'+Ye'=xR+yG+zB;GR

Even number field, (n+1)th row:

mth column G'+Cy'=xR+yG+zB;GB (m+1)th column Mg'+Ye'=xR+yG+zB;WR

Odd number field, nth row:

mth column Cy'+G'=xR+yG+zB;GB (m+1)th column Ye'+Mg'=xR+yG+zB;WR

Odd number field, (n+1)th row:

mth column Cy'+Mg'=xR+yG+zB;WB (m+1)th column Ye'+G'=xR+yG+zB;GR

A whole signal process will now be described hereinbelow.

The image pickup video signal which was read out from the image pickup device by the above scan is supplied to the CDS 107, by which a clock component and reset noises are eliminated. After that, the video signal is amplified by the variable gain amplifier 108 in accordance with a gain control signal. A black level of the signal is fixed to a value of about a lower limit reference in an input range of the A/D converter 120 by the clamping circuit 109. The signal is converted into the digital data signal.

The digital signal is supplied to a delay circuit to which the one-pixel delay circuits 201 DP-1 and DP-2 (horizontal line—2) and the horizontal pixel delay circuits 202 DL-1, DP-3, DP-4, DL-2, DP-5, and DP-6 are connected. Outputs from the delay elements are supplied to the mean circuit 203 by the following combination.

A/D, DP2, DL2, DP6
DP1, DP5
DL1, DP4

An output of the mean circuit 203 and an output of the DP-3 are supplied to the switching circuit 204. The line sequential signal ALT and dot sequential signal PALT are supplied to control signal input terminals of the switching circuit, so that the same kind of chrominance data series are generated from output terminals of the switching circuit.

An output of the switching data is connected to the subtracter 209, from which the cr and cb signals are generated. The outputs of the delay elements are also connected to the smoothing circuit 208. Integrating processes having gain differences of ¼, ½, and ¼ are executed among the three adjacent pixels, thereby obtaining the y signal.

The y, cr, and cb signals are supplied to the multiplier 206. The output of the MCU 112 is connected to another input terminal of the multiplier. A multiplier of an output of the switch can be controlled from the MCU. Matrix coefficients calculated by the above method to which coefficients for what is called a white balance were multiplied are generated from the MCU. The results of the multiplications of different kinds of signals among the outputs of the multiplier are added by the adder 207, thereby obtaining the primary color chrominance signal components.

The above output signal data is subjected to a gamma correcting process and a compression of the high level data by the gamma and knee processing section 205. Two kinds of color difference signals R-Y and B-Y are obtained by the matrix circuit 111.

Phase references according to a predetermined broadcasting standard are added to the above two kinds of color difference signal data by the modulator 113 in accordance with the color burst flag timing signal BF. After that, the data having the same amplitude as that of the signal data and whose sign is opposite to that of the signal data is produced. The above four data series are generated in correspondence to the four kinds of phases of the subcarriers so that the phase of the data series having the opposite sign and the frequency that is four times as high as the subcarrier frequency of the predetermined standard is set to the opposite phase. The above data series outputs are converted into the analog signals by the D/A converter 114 and supplied to a band pass filter (not shown) having a center frequency corresponding to the subcarrier frequency.

In the luminance signal, the chrominance signal modulation carrier which is determined by the pixel arrangement of the color component extraction pixels of the image pickup device is eliminated by a low pass filter 203-d. The luminance signal is formed by the luminance signal forming section to execute the gamma process and the knee process.

According to the embodiment as mentioned above, the hue adjustment of the chrominance signal processing section of the single plate camera signal can be quantitatively executed.

Figure 7:
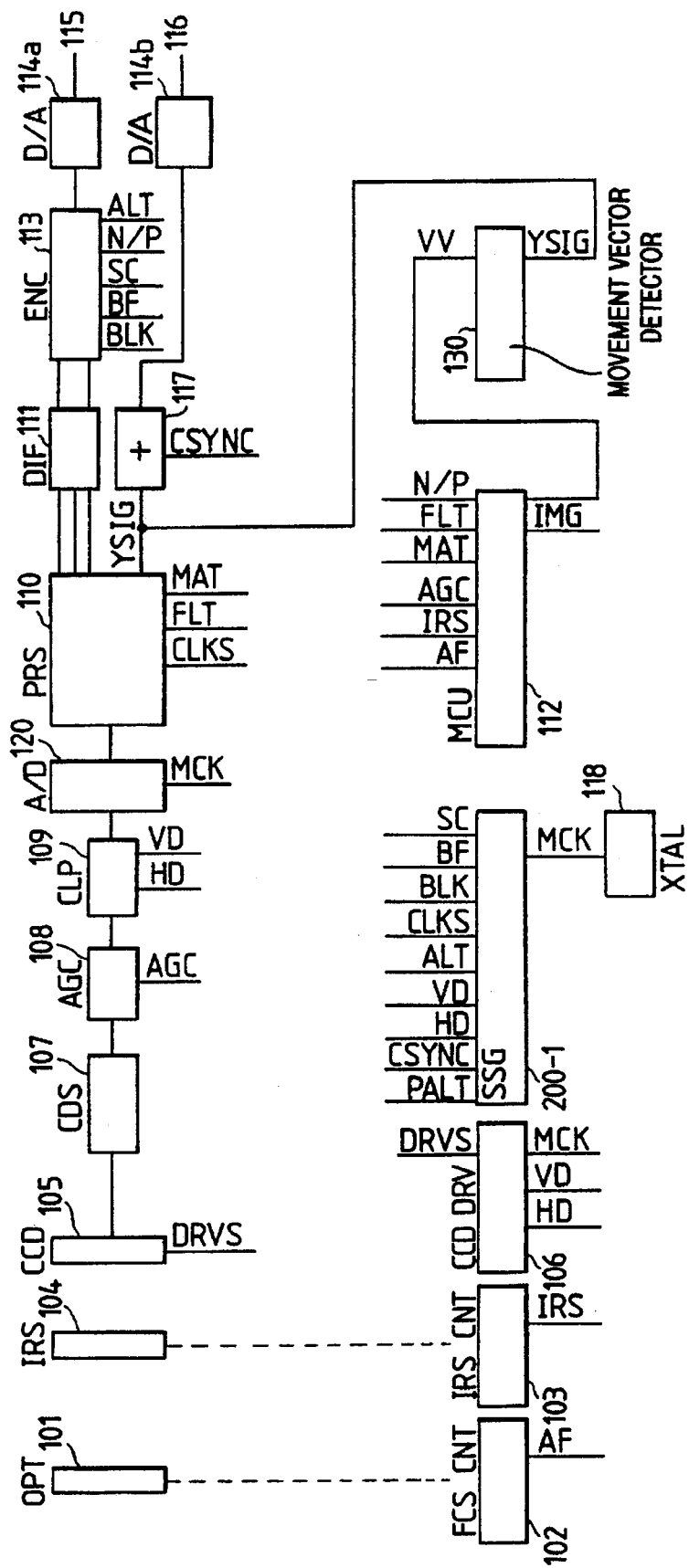
FIG. 7 is a block diagram showing another embodiment of the invention.

FIG. 7 is a block diagram of a solid-state image pickup apparatus to realize another embodiment. In FIG. 7, the same portions as those shown in FIGS. 5 and 6 are designated by the same reference numerals and their descriptions are omitted.

Reference numeral 130 denotes a movement vector detector which is used in the embodiment.

Figure 8:
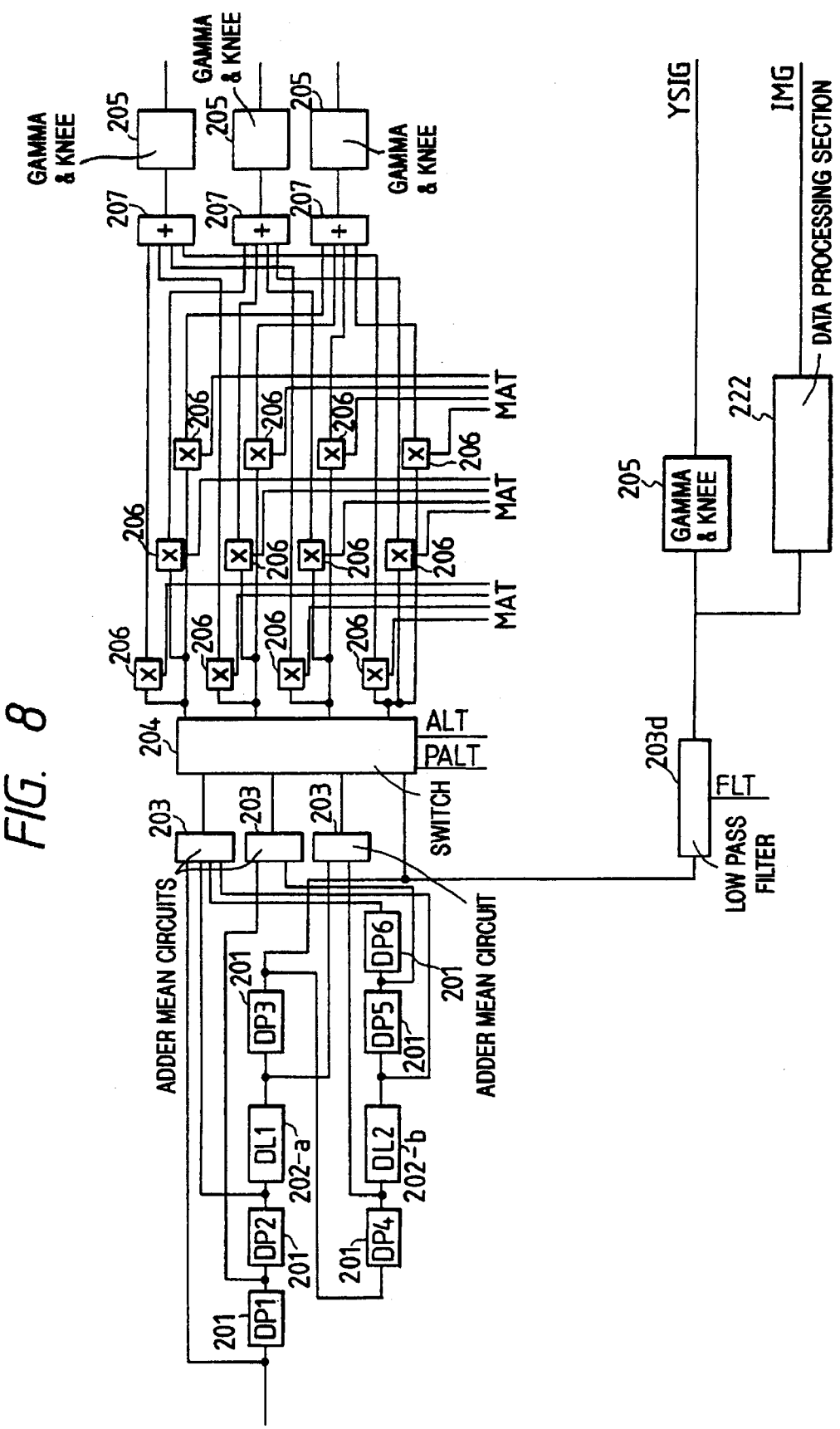
FIG. 8 is a diagram showing an example of a construction of a signal processing circuit 110 shown in FIG. 7.

FIG. 8 is a diagram showing an example of a construction of the signal processing circuit shown in FIG. 7 and its construction is almost similar to the circuit construction shown in FIG. 6 except that the number of multipliers 106 differs and the multipliers 106 execute arithmetic operations different from those in FIG. 6.

An incident light amount of an object to be photographed (not shown) is adjusted by the image pickup lens 101 and iris control system 103 and is accumulated as charges into the photosensitive accumulating section of the image pickup device 105. The accumulated charges are transferred to the vertical transfer section in the image pickup device (not shown) in the period of time corresponding to the vertical blanking period of time of the video signal. The charges transferred to the vertical transfer section are sent to the horizontal transfer section (not shown) in the image pickup device in the horizontal blanking period of time. The charges transferred to the horizontal transfer section are generated from the horizontal transfer section in the effective video period of time in the following manner and are converted into the voltage.

Even number field, nth row:
mth column Mg+Cy=R+G+2B;WB
(m+1)th column G+Ye =R+2G;GR
Even number field, (n+1)th row:
mth column G+Cy=2G+B;GB
(m+1)th column Mg+Ye=2R+G+B;WR
Odd number field, nth row:
mth column Cy+G=2G+B;GB
(m+1)th column Ye+Mg=2R+G+B;WR
Odd number field, (n+1)th row:
mth column Cy+Mg=R+G+2B;WB
(m+1)th column Ye+G=R+2G;GR In the image pickup video signal which was read out from the image pickup device by the above operation, the clock component and reset noises are eliminated by the CDS 107. After that, the signal is amplified by the variable gain amplifier 108 by the gain according to the gain control signal. A black level of the signal is fixed to a value of about a lower limit reference in an input range of the A/D converter 120 by the clamping circuit 109. The signal is converted into the digital data signal.

The digital signal is sent to the delay circuit to which the 1-pixel delay circuits 201 DP-1 and DP-2 (one horizontal line—2) and the horizontal pixel delay circuits 202 DL-1, DP-3, DP-4, DL-2, DP-5, and DP-6 are connected. The outputs from the delay elements are supplied to the mean circuit 203 by the following combination.

A/D, DP2, DL2, DP6
DP1, DP5
DL1, DP4

The output of the mean circuit and the output of the DP-3 are supplied to the switching circuit 204. The line sequential signal ALT and the dot sequential signal PALT are supplied to control signal input terminals of the switching circuit, so that the same kind of chrominance signal data series are generated from output terminals of the switching circuit.

The switching data output is sent to the multiplier 206. The output of the MCU 112 is connected to another input terminal of the multiplier. A multiplier of the output of the switch can be controlled from the MCU. Among the outputs of the multipliers, the results of the multiplications of the different kinds of signals are added by the adder 207, thereby obtaining the primary color chrominance signal components.

When an object which has an aliasing frequency component of four vertical pixels and doesn't move in the vertical direction is subjected to a color demodulating process by the color demodulation matrix of FIG. 1, carriers which are generated are set to G of GB and Mg of WR having phases which are different by 180 degrees from Mg of WB and G of GR and from Mg of WB and G of GR. Therefore, the coefficients of the above arithmetic operating processes are determined so as to equalize the gains of the signals also including the demodulating system from the CCDs of G of GB and Mg of WR of the phases which are different by 180 degrees from Mg of WB and G of GB and from Mg of WB and G of GR.

When an object having a movement component in the vertical direction is subjected to the color demodulating process by the color demodulation matrix of FIG. 1, carriers which are generated are set to Cy of GB and Ye of WR having phases which are different by 180 degrees from Cy of WB and Ye of GR and from Cy of WB and Ye of GR. Therefore, the coefficients of the above arithmetic operating processes are determined so as to equalize the gains of the signals also including the demodulating system from the CCDs of Cy of GB and Ye of WR having the phases which are different by 180 degrees from Cy of WB and Ye of GR and from Cy of WB and Ye of GR.

The MCU supplies the above matrix to the chrominance signal forming circuit for the vertical blanking period of time in accordance with a vertical vector detection signal W of the movement vector detector 130.

The above output signal data is subjected to the gamma correcting process and the compression of the high level data by the gamma and knee processing section 205. The color difference signal data is formed from the primary color signal data by the color difference signal forming section 111 in accordance with a predetermined ratio.

The phase references according to a predetermined broadcasting standard are added to the above two kinds of color difference signal data by the modulator 113 in accordance with the color burst flag timing signal BF. After that, the data having the same amplitude as that of the signal data and whose sign is opposite to that of the signal data is formed. The above four data series are generated in correspondence to the four kinds of phases of the subcarrier so that phase of the data series whose frequency is four times as high as the subcarrier frequency of the predetermined standard and which has the opposite sign is set to the opposite phase. The above four data series outputs are converted into the analog signals by the D/A converter 114 and are sent to the band pass filter (not shown) having a center frequency corresponding to the subcarrier frequency. As for the luminance signal, the chrominance signal modulation carrier which is determined by the pixel arrangement of the color component extraction pixels of the image pickup device is eliminated by the low pass filter 203d. The luminance signal is formed by the luminance signal forming section to execute the gamma process and the knee process.

In the embodiment, although the vertical movement component detector uses the luminance singal as detecting means, it is also possible to use another physical detecting means such as acceleration or the like in the vertical direction of the video camera.

As mentioned above, by switching the color demodulation matrix by the vertical movement vector of the video signal, the color video signal without an interference such as a vertical false color or the like can be also obtained even in case of images other than a still image.

Figure 9:
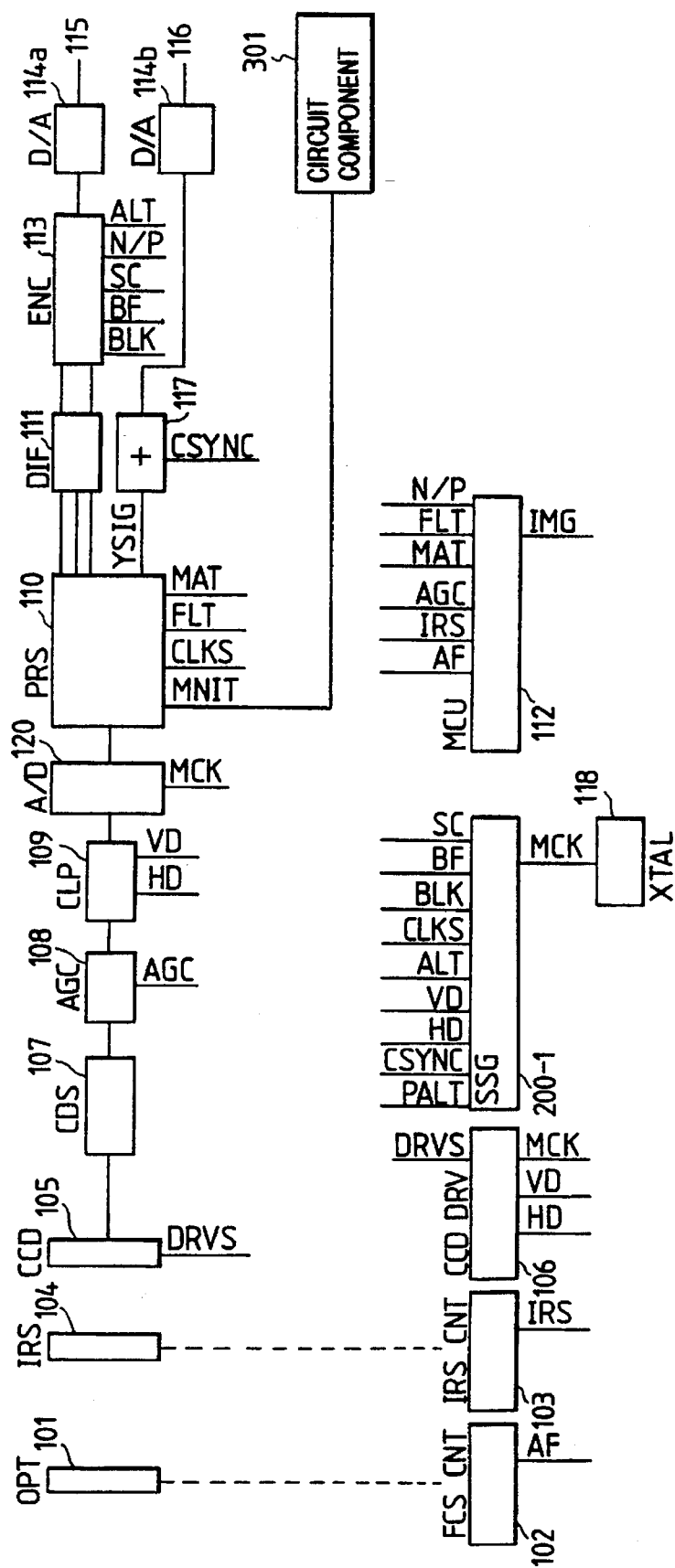
FIG. 9 is a block diagram showing still another embodiment of the invention.
Figure 10:
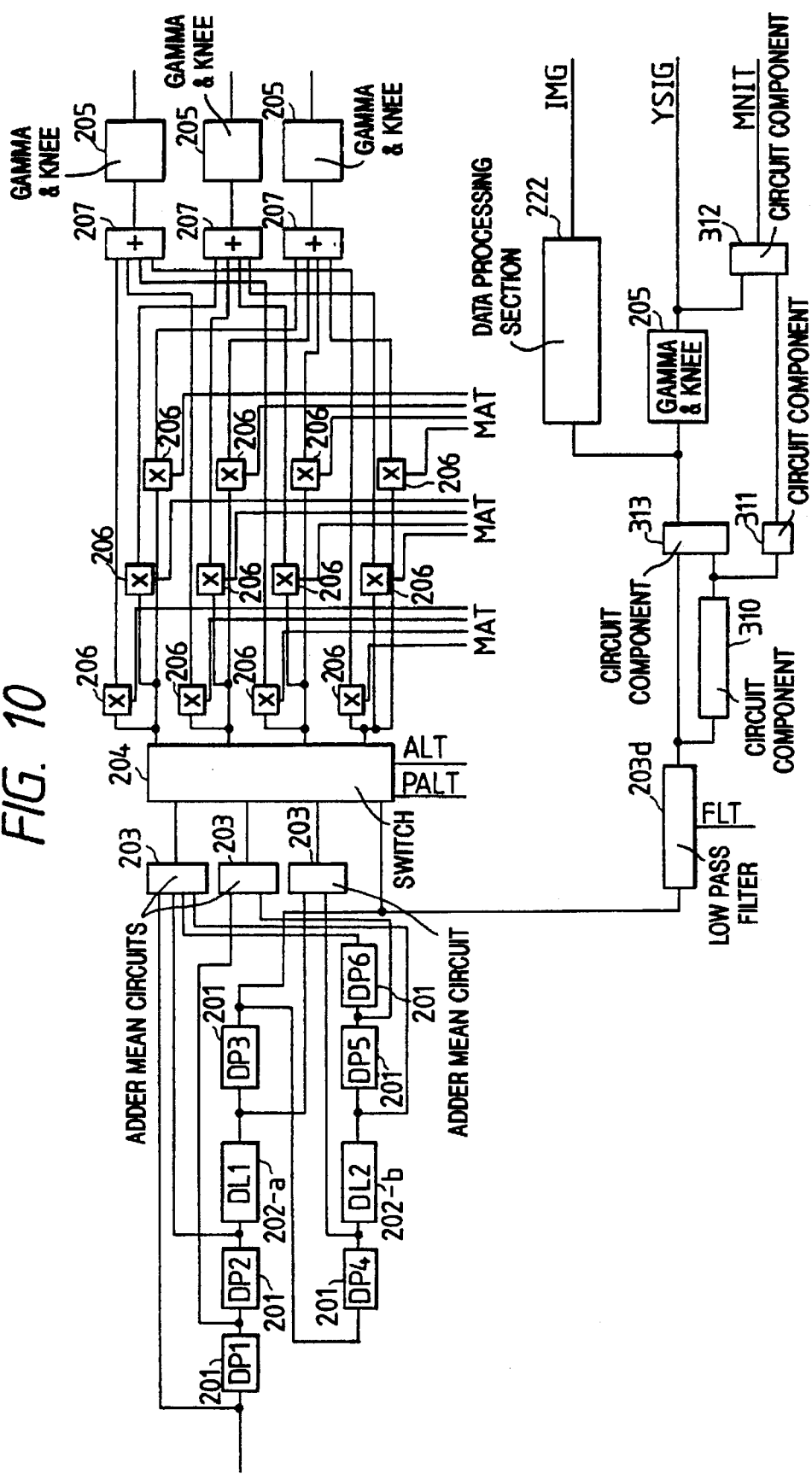
FIG. 10 is a diagram showing an example of a construction in the signal processing circuit 110 shown in FIG. 9.

FIG. 9 is a diagram showing another embodiment and FIG. 10 is a diagram showing an example of a construction of the signal processing circuit 110 shown in FIG. 9.

An incident light amount of an object to be photographed (not shown) is adjusted by the image pickup lens 101 and iris control system 103 and is accumulated as charges into the photosensitive accumulating section of the image pickup device 105. The accumulated charges are transferred to the vertical transfer section in the image pickup device (not shown) in the period of time corresponding to the vertical blanking period of time of the video signal. The charges transferred to the vertical transfer section are sent to the horizontal transfer section (not shown) in the image pickup device for the horizontal blanking period of time. The charges transferred to the horizontal transfer section are generated from the horizontal transfer section in the effective video image period of time and are converted into the voltage. Sequences of the signals which are read out and signal compositions are shown below.

Even number field, nth row:

mth column Mg'+Cy'=xR+yG+zB;WB (m+1)th column G'+Ye'=xR+yG+zB;GR

Even number field, (n+1) th row:

mth column G'+Cy'=xR+yG+zB;GB (m+1)th column Mg'+Ye'=xR+yG+zB;WR

Odd number field, nth row:

mth column Cy'+G'=xR+yG+zB;GB (m+1)th column Ye'+Mg'=xR+yG+zB;WR

Odd number field, (n+1)th row:

mth column Cy'+Mg'=xR+yG+zB;WB (m+1)th column Ye'+G'=xR+yG+zB;GR

An example of a construction of the above color separation matrix is shown below.

In a color temperature range T0 to T1 in which good color separating characteristics should be maintained, objects in which it is intended that the color separation outputs (R, G, B) derived from the object data obtained in T0 satisifies the following equation $$(R, G, B) = (X0, 0, 0) (0, Y0, 0) (0, 0, Z0)$$

are photographed. When the following four kinds of signal data Sig(WB, WR, GR, GB) are obtained with respect to the respective objects, $$Sig0x = (WB0x, WR0x, GR0x, GB0x)$$

$$Sig0y = (WB0y, WR0y, GR0y, GB0y)$$

$$Sig0z = (WB0z, WR0z, GR0z, GB0z)$$

The color separation matrix satisfies the following equation.

$$A0 = \alpha 0ij \ (i=0, 1, 2, j=0, 1, 2, 3)$$

By solving the above equations, $$A0 * Sig0x = (X0, 0, 0)$$

$A0*Sig0y=(0, Y0, 0)$ $A0*Sig0z=(0, 0, Z0)$ the following equations are obtained.

$\alpha i0=(f1-f2\ \alpha i3)/f0$ $\alpha i1=(e1-e2\ \alpha i3)/e0$ $\alpha i2=(d1-d2\ \alpha i3)/d0$ $\alpha i3$ (i=0, 1, 2)

where $d0=b0a1-b1a0$ $d1=b0a3-a0b3$ $d2=b0a2-b2a0$ $e0=a0$ $e1=a3-a1d1/d0$ $e2=a2-a1d2/d0$ $f0=WBx$ $f1 =$ $\{X - WRx\ e1/e0 - GRx\ d1/d0\ (i = 0) - WRx\ e1/e0 - GRx\ d1/d0\ (i = 1,2)$ $f2=GBx-WRx\ e2/e0-GRx\ d2/d0$ Now $a0=WB0yWR0x-WB0xWR0y$ $a1=WB0yGR0x-WB0xGR0y$ $a2=WB0yGB0x-WB0xGB0y$ $a3 = \{WB0y\ X0(i = 0) - WB0x\ Y0(i = 1)\ 0(i = 2)$ $b0=WB0zWR0x-WB0xWR0z$ $b1=WB0zGR0x-WB0xGR0z$ $b2=WB0zGB0x-WB0xGB0z$ $b3 = \{WB0z\ X0(i = 0)\ 0(i = 1) - WB0x\ Z0\ 0(i = 2)$ Objects such that it is intended that the color separation outputs (R, G, B) obtained from the object data derived in T1 are set to (R1, G1, B1)=(X1, 0, 0) (0, Y1, 0) (0, 0, Z1)

are photographed. When the following four kinds of signal data Sig(WB, WR, GR, GB) are obtained with respect to the respective objects, $Sig1x=(WB1x, WR1x, GR1x, GB1x)$ $Sig1y=(WB1y, WR1y, GR1y, GB1y)$ $Sig1z=(WB1z, WR1z, GR1z, GB1z)$ the color separation matrix satisfies the following equation.

$A1=\alpha 1ij$ (i=0, 1, 2, j=0, 1, 2, 3)

By solving the following equations, $A1*Sig1x=(X1, 0, 0)$ $A1*Sig1y=(0, Y1, 0)$ $A1*Sig1z=(0, 0, Z1)$ the following equations are obtained.

$\alpha i0=(f1-f2\ \alpha i3)/f0$ $\alpha i1=(e1-e2\ \alpha i3)/e0$ $\alpha i2=(d1-d2\ \alpha i3)/d0$ $\alpha i3$ (i=0, 1, 2)

where $d0=b0a1-b1a0$ $d1=b0a3-a0b3$ $d2=b0a2-b2a0$ $e0=a0$ $e1=a3-a1d1/d0$ $e2=a2-a1d2/d0$ $f0=WBx$ $f1 =$ $\{X - WRx\ e1/e0 - GRx\ d1/d0(i = 0) - WRx\ e1/e0 - GRx\ d1/d0(i = 1,2)$ $f2=GBx-WRx\ e2/e0-GRx\ d2/d0$ Now $a0=WB1yWR1x-WB1xWR1y$ $a1=WB1yGR1x-WB1xGR1y$ $a2=WB1yGB1x-WB1xGB1y$ $a3 = \{WB1y\ X1(i = 0) - WB1x\ Y1(i = 1)\ 0(i = 2)$ $b0=WB1zWR1x-WB1xWR1z$ $b1=WB1zGR1x-WB1xGR1z$ $b2=WB1zGB1x-WB1xGB1z$ $b3 = \{WB1z\ X1(i = 0)\ 0(i = 1) - WB1x\ Z1(i = 2)$ The color separation matrix is $A=[\beta i\alpha ij](i=0, 1, 2, j=0, 1, 2, 3)$ The color separation matrix $A(\alpha ij)$ is as follows from the $A0(\alpha 0ij)$ and $A1(\alpha 1ij)$ obtained from the above equations.

$\alpha ij=\beta i(k\alpha 0ij+(1-k)\alpha 1ij)(i=0, 1, 2, j=0, 1, 2, 3)$ $\beta i$ denotes coefficients for what is called a white balance process. For example, coefficients such as to equalize the integration values of RGB of the whole image plane of the object or coefficients such that which are varied in accordance with the color temperature or the like of a light source which is irradiated to the object are used. Even when $\alpha i3$ has an arbitrary value, the color separating characteristics are preserved. Therefore, it is sufficient to select numerical values in a manner such that a dynamic range of the signal, a 2-dimensional response frequency which is determined by the arrangement of the color filter, or the like is set to a desired value. The value of K is determined in accordance with the conditions such as appearance frequency of the color temperature of the object, color temperature which pays importance to the color separating characteristics, and the like. The whole signal process will now be described hereinbelow.

In the image pickup video signal which was read out from the image pickup device by the above scan, the clock component and reset noises are eliminated by the CDS 107. After that, the signal is amplified by the variable gain amplifier 108 by the gain according to the gain control signal. A black level of the signal is fixed to a value of about lower limit reference in an input range of the A/D converter 120 by the clamping circuit 109. The signal is converted into the digital data signal.

The digital signal is supplied to the delay circuit to which the 1-pixel delay circuits 201 DP-1 and DP-2 (one horizontal line—2) and the horizontal pixel delay circuits 202 DL-1, DP-3, DP-4, DL-2, DP-5, and DP-6. Outputs from the delay elements are supplied to the mean circuits 203 by the following combination.

A/D, DP2, DL2, DP6
DP1, DP5
DL1, DP4

The output of the mean circuit and the output of the DP-3 are supplied to the switching circuit 204. The line sequential signal ALT and the dot sequential signal PALT are supplied to control signal input terminals of the switching circuit, so that the same kind of chrominance signal data series are generated from output terminals of the switching circuit.

The switching data output is supplied to the multiplier 206. The output of the MCU 112 is connected to another input terminal of the multiplier. The multiplier of the output of the switch can be controlled from the MCU. The matrix coefficients to which the coefficients for the white balance were multiplied and which were calculated by the above method are generated from the MCU. Among the outputs of the multipliers, the results of the multiplications of the different kinds of signals are added by the adder 207, thereby obtaining the primary color chrominance signal components.

The above output signal data is subjected to the gamma correcting process and the compression of the high level data by the gamma and knee processing section 205. The color difference signal data is formed from the primary color signal data by the color difference signal forming section 111 in accordance with a predetermined ratio.

The phase references according to a predetermined broadcasting standard are added to the above two kinds of color difference signal data by the modulator 113 in accordance with the color burst flag timing signal BF. After that, the data having the same amplitude as that of the signal data and the sign opposite to that of the signal data is formed. The above four data series are generated in correspondence to the four kinds of phases of the subcarrier in a manner such that the phase of the data series having the frequency that is four times as high as the subcarrier frequency of the predetermined standard and the opposite sign is set to the opposite phase. The above data series outputs are converted into the analog signals by the D/A converter 114 and supplied to the band pass filter (not shown) having a center frequency corresponding to the subcarrier frequency.

As for the luminance signal, the chrominance signal modulation carrier which is determined by the pixel arrangement of the color component extraction pixels of the image pickup device is eliminated by the low pass filter 203-$d$. The luminance signal is formed by the luminance signal forming section to perform the gamma process and the knee process.

When the color separating process is actually executed, in order to perform the white balance process, in case of obtaining the color separation matrix, there is no restricting condition of the level among RGB. Therefore, in the above matrix, it is sufficient that the values of X, Y, and Z are set to arbitrary real numbers other than 0. In the above embodiment, the data which approximates the color separation matrix has been obtained from the objects of the RGB pure color system of (R, G, B)=(X, 0, 0) (0, Y, 0) (0, 0, Z)

However, the color separation matrix can be also constructed by a similar method from the data of the complementary color system of Ye, Cy, and Mg of (R, G, B)=(X0, X, 0) (0, Y0, Y1) (Z0, 0, Z1)

According to the embodiment as mentioned above, it is possible to provide an image pickup apparatus which maintains the good color separating characteristics even when the color temperature of the object changes.

As described in detail above, according to each of the embodiments, since the color separation has been executed while adjusting the arithmetic operation coefficients in the step of obtaining the primary color components, the hue adjustment can be accurately executed in the chrominance signal processing section of the single plate camera signal. The good color separating characteristics can be realized.

What is claimed is:

1. A solid-state image pickup apparatus having (a) color filters for transmitting different color lights, which filters are sequentially arranged on photosensitive devices in a solid-state image pickup device, (b) means for forming an object image onto the solid-state image pickup device, and (c) means for executing arithmetic operating processes to multiply predetermined arithmetic operation coefficients to output signals corresponding to the different color lights of the solid-state image pickup device, thereby obtaining primary color components, said apparatus comprising:

arithmetic operation coefficient adjusting means for projecting color compositions of the solid-state image pickup device into a space that is not independent to each of the primary color component signals and incorporating adjustment coefficients and, after that, for again projecting the color compositions into the primary color component space, and for adjusting the arithmetic operation coefficients by magnitudes of the adjustment coefficients.

* * * * *

UNITED STATES PATENT AND TRADEMARK OFFICE
CERTIFICATE OF CORRECTION

PATENT NO. : 5,648,818
DATED : July 15, 1997
INVENTOR(S) : Tsutomu FUKATSU

It is certified that error appears in the above-identified patent and that said Letters Patent is hereby corrected as shown below:

COLUMN 2:
    Line 5, "comprise:" should read --comprising:--.

COLUMN 3:
    Line 40, "herein-later" should read --hereinlater--.

COLUMN 6:
    Line 10, "2," should read --2;--.

COLUMN 7:
    Line 61, "T0" should read --T1--.

COLUMN 9:
    Line 51, "ix" should read --in--.

COLUMN 14:
    Line 63, "2," should read --2;--.

UNITED STATES PATENT AND TRADEMARK OFFICE
CERTIFICATE OF CORRECTION

PATENT NO. : 5,648,818
DATED : July 15, 1997
INVENTOR(S) : Tsutomu FUKATSU

It is certified that error appears in the above-identified patent and that said Letters Patent is hereby corrected as shown below:

COLUMN 15:
  Line 47, "0(i=2)" should read --(i=2)--;
  Line 67, "2," should read --2;--.

COLUMN 16:
  Line 53, "2," should read --2;--.

COLUMN [56]:
  Line 1, "0586204A1 8/1993 Japan" should read --0586204A1 3/1994 European Pat. Off.--.

Signed and Sealed this

Twelfth Day of May, 1998

*Attest:*

BRUCE LEHMAN

*Attesting Officer*     *Commissioner of Patents and Trademarks*